United States Patent
Yamaki et al.

(10) Patent No.: US 6,633,157 B1
(45) Date of Patent: Oct. 14, 2003

(54) DISPLACEMENT DETECTING DEVICE

(75) Inventors: Toshihiro Yamaki, Wako (JP); Kenji Abe, Wako (JP); Kouichi Ikoma, Wako (JP); Yasuo Shimizu, Wako (JP); Minoru Nakamura, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/714,358

(22) Filed: Nov. 16, 2000

(30) Foreign Application Priority Data

Dec. 1, 1999 (JP) .......................... 11-342483
Nov. 9, 2000 (JP) ....................... 2000-342188

(51) Int. Cl.$^7$ .............................. G01B 7/14; F01L 9/04
(52) U.S. Cl. ............................. 324/207.2; 324/207.24; 123/90.11; 137/554
(58) Field of Search ................. 324/207.13, 207.21, 324/207.2, 207.22, 207.24, 207.25, 207.26; 338/32 R, 321 T; 123/568.26, 188.17, 90.11, 612, 617; 137/554; 251/129.1

(56) References Cited

U.S. PATENT DOCUMENTS

| | | | | |
|---|---|---|---|---|
| 3,906,469 A | * | 9/1975 | Kronk | 340/188 |
| 4,107,604 A | * | 8/1978 | Bernier | 324/208 |
| 4,782,798 A | * | 11/1988 | Jones | 123/90.11 |
| 4,805,571 A | * | 2/1989 | Humphrey | 123/316 |
| 5,069,422 A | * | 12/1991 | Kawamura | 251/129.1 |
| 5,592,905 A | * | 1/1997 | Born | 123/90.11 |
| 5,621,293 A | | 4/1997 | Gennesseau | 318/687 |
| 5,769,043 A | * | 6/1998 | Nitkiewicz | 123/90.11 |
| 5,955,881 A | * | 9/1999 | White et al. | 324/207.2 |
| 6,213,147 B1 | * | 4/2001 | Gramann et al. | 137/554 |
| 6,215,299 B1 | * | 4/2001 | Reynolds et al. | 324/207.2 |

FOREIGN PATENT DOCUMENTS

| | | |
|---|---|---|
| JP | 5-501597 | 3/1993 |
| JP | 2749748 | 2/1998 |
| WO | WO91/08384 | 6/1991 |

* cited by examiner

*Primary Examiner*—N. Le
*Assistant Examiner*—Darrell Kinder
(74) *Attorney, Agent, or Firm*—Lahive & Cockfield, LLP

(57) ABSTRACT

Displacement of a mechanical element is accurately detected by a simple and inexpensive structure. To provide displacement detecting device including: a mechanical element capable of being displaced; a magnet connected to the mechanical element and magnetized in displacement direction of the mechanical element; and a magnetic sensor for detecting a magnetic flux generated by the magnet and outputting a sensor output corresponding to a detected magnetic-flux value, so as to detect displacement of the mechanical element in accordance with the sensor output. In one embodiment, a Hall element is used as the magnetic sensor and the magnet longer than distance of movement of the mechanical element is used. Thus, an output having a linear relation with displacement of the mechanical element is obtained, and detection of the displacement is easily implemented. The displacement detecting device can be applied to an actuator of intake/exhaust valves of an engine. In another embodiment, a magnetic material provided between the Hall element and a spring to reduce the disturbance caused by the spring. Moreover, a transfer shaft connected to the intake/exhaust valve is made of a non-magnetic material or a material having characteristics close to the non-magnetic material to reduce the effect of leakage flux.

21 Claims, 13 Drawing Sheets

DISPLACEMENT DETECTING DEVICE

FIELD OF THE INVENTION

The present invention relates to an apparatus for detecting displacement of a mechanical element, particularly to an apparatus for detecting displacement of a mechanical element driven by an actuator in accordance with a magnetic flux generated by a magnet magnetized in displacement direction.

BACKGROUND OF THE INVENTION

Various methods for detecting the displacement have been proposed. Japanese Patent No. 2749748 discloses the method for detecting displacement of a movable magnet member by measuring a magnetic-flux density in a gap between an electromagnet and the movable magnet member. Moreover, as another embodiment in the specification, a method for detecting the displacement of the movable magnet member by measuring a capacitance in a gap between an electromagnet and the movable magnet member is disclosed. Furthermore, methods for detecting the displacement has been proposed, for example, by detecting an eddy current or by the use of a differential transformer.

In the case of an actuator for generally driving a mechanical element, a mechanical element is not only driven through mechanical driving by connection of a cam with a rod but also it is electro-magnetically driven. An electromagnetic actuator drives a mechanical element by attracting an electromagnet by exciting an electromagnetic coil in accordance with an electrical signal. In the case of driving the electromagnetic actuator, because the driving timing and driving force can be optionally changed by controlling electrical signals, it is frequently used in a field requiring precise timing control or variable control.

Also in the case of a vehicle, an actuator is used for various portions including an idle control valve, fuel injection valve, and EGR control valve of an engine. Particularly, it is desired to apply an electromagnetic actuator to intake/exhaust valves of an engine as a future possibility. A system for mechanically changing the timing of intake/exhaust valves of an engine in accordance with engine rotation has been practically used. By driving intake/exhaust valves by an electromagnetic actuator, it is possible to flexibly control the valve timing and improve the output characteristics and fuel consumption of an engine.

Intake/exhaust valves of the engine of a vehicle need to be opened and closed at a high speed, which requires an accurate timing in either of mechanical driving and electromagnetic driving. Therefore, it is necessary to accurately detect displacement of a mechanical element for driving an actuator so that the valve timing can be properly controlled.

Displacement detection by the above-described methods has problems of high cost because shielding lines are used to obtain a preferable S/N ratio. The number of harnesses and the number of parts are increased because driving signals are different from detection signals and a wave-shaping circuit is required. Displacement detection is subject to disturbance because of detecting a feeble signal, and it is difficult to obtain stable outputs. Moreover, to obtain a linear output characteristic at the time of measuring a magnetic-flux density of a gap, it is necessary to measure magnetic-flux densities of upper and lower gaps, which gives rise to a problem of increasing number of parts.

Therefore, it is an object of the present invention to provide a displacement detecting device having an inexpensive structure and capable of detecting displacement of a mechanical element without increasing the number of harnesses and the number of parts.

It is another object of the present invention to provide a displacement-detecting device capable of providing linear output of displacement of a mechanical element.

It is further object of the present invention to provide a displacement-detecting device capable of reducing the effect of disturbance.

SUMMARY OF THE INVENTION

In accordance with one aspect of the invention, the displacement detecting device comprises a mechanical element capable of being displaced, a magnet connected to the mechanical element and magnetized in displacement direction of the mechanical element, and a magnetic sensor for detecting a magnetic flux generated by the magnet and outputting a sensor output corresponding to the detected magnetic-flux value, and detects displacement of the mechanical element in accordance with the sensor output. The displacement-detecting device has a simple structure with limited number of parts.

In accordance with another aspect of the invention, the displacement-detecting device has a configuration in which the magnetic sensor is a Hall element and the sensor output is a Hall voltage. Because a Hall element produces a Hall voltage proportional to a magnetic-flux density, it is possible to obtain a linear output for displacement. Reliable output is obtained with a simple structure.

In accordance with further aspect of the invention, the displacement-detecting device has a configuration in which the length of displacement direction of the magnet is larger than the distance of movement of the mechanical element and the quantity of magnetic flux detected by the magnetic sensor changes linearly with respect to displacement of the magnet. A linear output is obtained with respect to displacement.

In accordance with yet another aspect of the invention, the displacement-detecting device has a configuration in which the magnet is connected to the mechanical element through a non-magnetic member or a material having characteristics close to the non-magnetic material. Because the magnet is connected to the mechanical element through a non-magnetic member or a material having characteristics close to the non-magnetic material, the magnetic sensor is able to detect a magnetic flux generated by the magnet without significant disturbance in a magnetic field.

In accordance with one embodiment, the mechanical element is an intake/exhaust valve of an engine. Accuracy of the valve timing controlled by an actuator is improved.

In accordance with one aspect of the invention, the magnet is provided on a spring seat supporting a spring, and the spring seat is connected to the intake/exhaust valve via a transfer shaft. The magnetic sensor is provided between the magnet and the spring. The magnetic sensor detects magnetic flux in the horizontal direction generated by the magnet and outputs a voltage proportional to displacement of the magnet. Thus, the detection of displacement of the intake/exhaust valve is facilitated.

In accordance with another aspect of the invention, a magnetic material or magnet is provided between the magnetic sensor and the spring. The effect of the spring on the magnetic flux generated by the magnet is reduced, accuracy of the detection of displacement of the intake/exhaust valve being improved.

In accordance with yet another aspect of the invention, the magnet is connected to the intake/exhaust valve via a transfer shaft that is made of a non-magnetic member or a material having characteristics close to the non-magnetic material. The effect of leakage flux is reduced, accuracy of displacement of the intake/exhaust valve of the engine being improved.

In accordance with yet another aspect of the invention, the magnet is provided on a spring seat connected to the transfer shaft, and the spring seat is made of a non-magnetic member or a material having characteristics close to the non-magnetic material. Because the spring seat is made of a non-magnetic member or a material having characteristics close to the non-magnetic material, the magnetic sensor is able to detect a magnetic flux generated by the magnet without significant disturbance to the magnetic field.

In accordance with yet another embodiment, the magnet is a cylindrical permanent magnet. Because a magnet can be easily fixed so as to connect with the transfer shaft of an actuator, the detection of displacement of the mechanical element by detecting magnetic flux from the magnet is implemented with a simple structure.

DETAILED DESCRIPTION OF THE PREFERRED EMBODIMENTS

Preferred embodiments of the present invention will be described below by referring to accompanying drawings. In one embodiment, an electromagnetic actuator is used for driving a valve of an engine. The present invention is not limited to driving of a valve of an engine. It can be widely applied to systems for driving mechanical elements.

Figure 1:
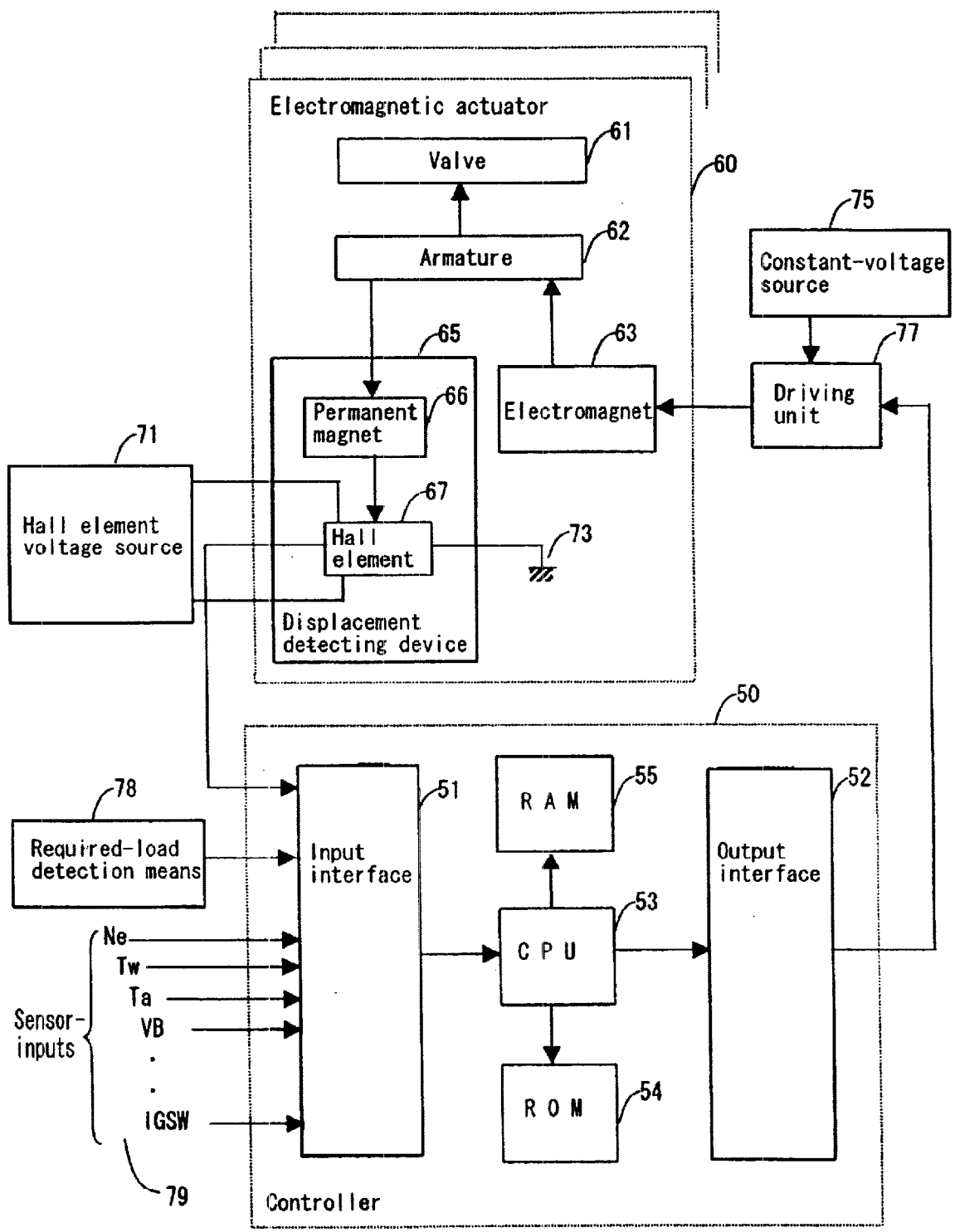
FIG. 1 is a block diagram showing a whole of an electromagnetic actuator and its controller in one embodiment of the present invention.

FIG. 1 is a block diagram showing a general configuration of an electromagnetic actuator 60 on which a displacement-detecting device 65 of the present invention is mounted. FIG. 1 also shows a general structure of a controller 50 of the actuator 60. The controller 50 comprises an input interface 51 for receiving signals from various sensors, a central processing unit 53 (hereafter referred to as "CPU"), a ROM (Read Only Memory) 54 for storing programs to be executed and data, a RAM (Random Access Memory) 55 for providing work areas for the CPU and for storing operation results, and an output interface 52 for supplying control signals to various sections of the engine.

A signal indicating displacement is input to the input interface 51 of the controller 50 from the displacement detecting device 65. Signals 79 received at the interface 51 from various sensors include signals indicating engine speed (Ne), engine water-temperature (Tw), intake-air temperature (Ta), battery voltage (VB), and ignition switch (IGSW). A desired torque detected by a required-load detection means 78 is also input to the interface 51. Based on these inputs, the controller 50 decides parameters on power supply timing, voltage to be supplied, and time for supplying power in accordance with control programs pre-stored in the ROM 54 and outputs control signals via the output interface 52 for properly controlling the electromagnetic actuator 60. The required-load detection means 78 can be implemented, for example, by an accelerator-pedal sensor, which detects pushed depth of an accelerator-pedal.

A driving unit 77 switches a voltage (e.g. 12 V) supplied from a constant-voltage source 75 so as to provide a predetermined current in accordance with the control signal supplied from the controller 50 and supplies the voltage to an electromagnet 63 of the electromagnetic actuator 60.

The electromagnetic actuator 60 is provided with a valve 61, an armature 62, the electromagnet 63, and the displacement-detecting device 65. A current flows through the electromagnet 63 in accordance with the voltage applied to the electromagnet 63 and accordingly the armature 62 is moved or displaced. The valve 61 is opened or closed correspondingly to displacement of the armature 62.

The displacement-detecting device 65 is provided with a permanent magnet 66 and a Hall element 67 serving as a magnetic sensor. The permanent magnet 66 moves along with the armature 62. A current is supplied to the Hall element 67 from a Hall element voltage source 71. The Hall element 67 outputs a voltage proportional to a magnetic-flux density generated by the permanent magnet 66. One of the output terminals of the Hall element 67 is connected to the controller 50 and a signal indicating an output voltage of the Hall element 67 is sent to the controller 50 through the input interface 51. The other one of the output terminals of the Hall element 67 is grounded (73 in FIG. 1).

In the present embodiment, the total of sixteen valves, eight each for intake valves and exhaust valves, are mounted on one vehicle. Thus, sixteen electromagnetic actuators 60 are used. The displacement-detecting device 65 is provided to each one of the actuators 60. By the use of a common earth line 73 to ground the Hall elements 67 of all the electromagnetic actuators 60, the number of wiring lines may be reduced. By connecting lines from the Hall element voltage source 71 to the Hall element 67 in parallel, the number of power lines may also be reduced. Thus, only signal lines necessary for individual electromagnetic actuators 60 are those extended from the Hall element 67 to the input interface 51. Sixteen displacement-detecting devices 65 may be mounted to sixteen ectromagnetic actuators 60 for sixteen valves with eighteen lines as a whole.

Figure 2:
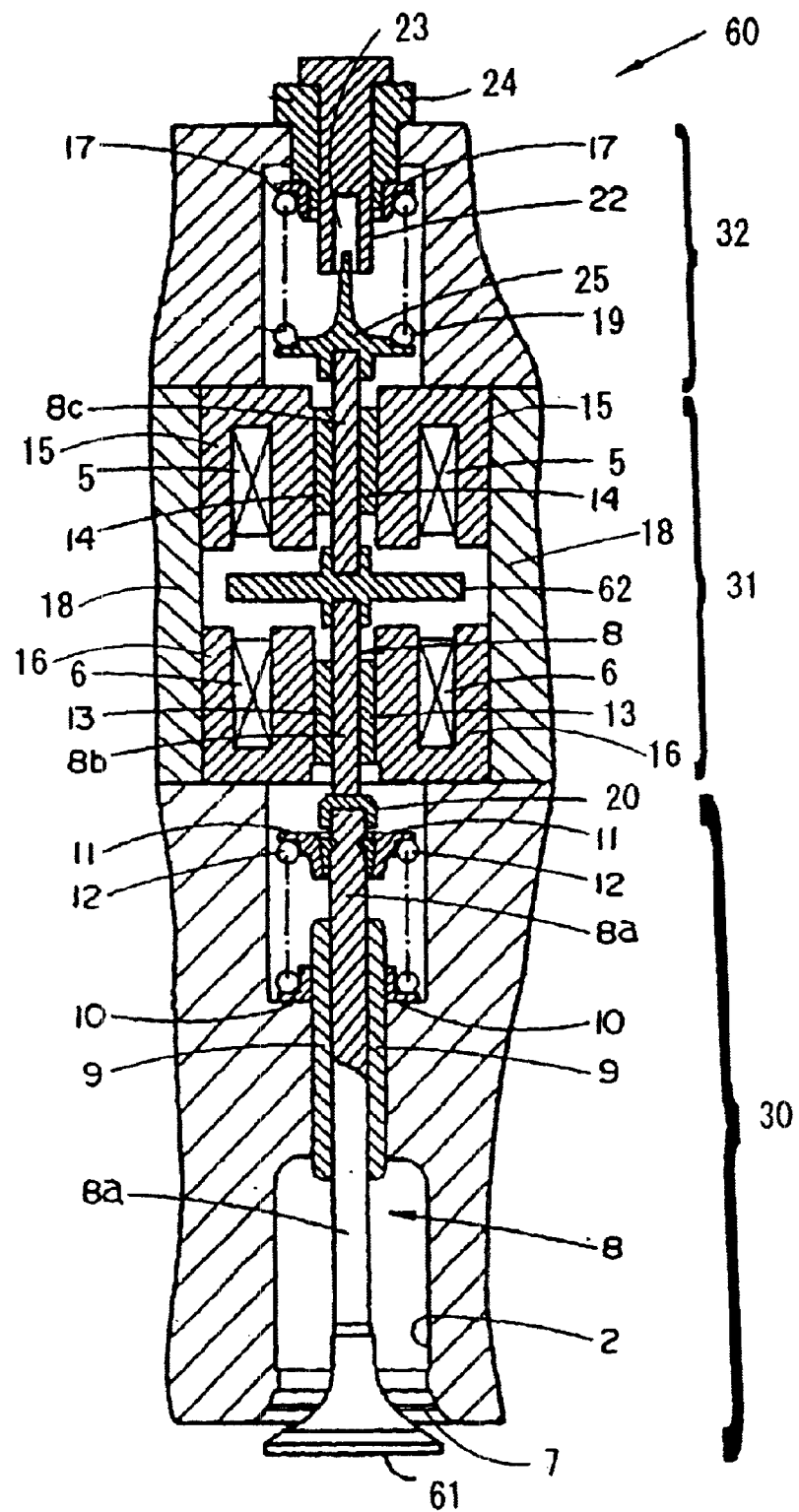
FIG. 2 is an illustration showing a mechanical structure of the electromagnetic actuator in one embodiment of the present invention.

FIG. 2 shows a sectional view of a general schematic structure of the electromagnetic actuator 60 on which the displacement-detecting device 65 of the present invention shown in FIG. 1 is to be mounted. The electromagnetic actuator 60 comprises a valve opening/closing section 30, a driving section 31, and displacement-detector mounting section 32. In the present embodiment, a transfer shaft 8 extending through the valve opening/closing section 30, driving section 31 and displacement detector mounting section 32 is divided into transfer shafts 8a, 8b, and 8c so as to prevent fluctuation of behavior of the armature to ensure smooth activation of the valve.

The valve opening/closing section 30 is provided with a valve 61 set to an intake passage or an exhaust passage (hereafter referred to as intake/exhaust passage) 2 of an internal combustion engine. When the valve 61 is driven upward by the electromagnetic actuator 60, it closely contacts the valve seat 7 provided to the intake/exhaust passage 2 of the engine to close the intake/exhaust passage 2. When the valve 61 is driven downward by the electromagnetic actuator 60, it leaves the valve seat 7 and lowers to a position apart from the valve seat 7 by a predetermined distance to open the intake/exhaust passage 2.

A transfer shaft 8 is connected to the upper end of the valve 61. The bottom end of the transfer shaft 8a is integrally connected to the valve 61 and supported by a valve guide 9 provided to an upper wall portion of the intake/exhaust passage 2 so as to be movable in the shaft direction. Moreover, the transfer shaft 8a is biased upward by a first spring member 12 provided between a bottom spring seat 10, which is provided around the valve guide 9, and a top spring seat 11. Thus, the transfer shaft 8a is always biased upward by the first spring member 12.

The driving section 31 is provided with a mechanism for driving the valve 61. A solenoid-type first electromagnet 5 provided to an upper position and a solenoid-type second electromagnet 6 provided to a lower position are provided in a housing 18 made of a non-magnetic material (hereinafter, the term "non-magnetic material" refers to a non-magnet material as well as a material having characteristics close to the non-magnetic material). The electromagnet 63 shown in FIG. 1 corresponds to the first electromagnet 5 or second electromagnet 6. The first electromagnet 5 is surrounded by a magnetic yoke 15 and the second electromagnet 6 is surrounded by a magnetic yoke 16. The armature 62 is provided between the first electromagnet 5 and the second electromagnet 6. The armature 62 is made of a disk like magnetic metal and is configured so as to be vertically moved by the attractive force produced by the first electromagnet 5 and the second electromagnet 6. The direction in which the armature 62 is displaced is hereafter referred to as displacement direction.

The transfer shaft 8b of the driving section 31 is connected to the upper end of the transfer shaft 8a through a cap member 20, passes through the second electromagnet 6, and is supported so as to be movable in the shaft direction through a cylindrical guide 13 made of a non-magnetic material. The upper end of the transfer shaft 8b supports the armature 62 at its bottom.

The lower end of the transfer shaft 8c of the driving section 31 supports the armature 62 at its top. The shaft 8c extends upward along the extension line of the transfer shaft 8b, passes through the first electromagnet 5, and is supported through a cylindrical guide 14 made of a non-magnetic material so as to be movable in the shaft direction. The upper end of the transfer shaft 8c is connected to the bottom of a spring seat 25.

An upper spring seat 17 is provided on a fixing member 24 that is located above the spring seat 25. The transfer shaft 8c is biased downward by a second spring member 19 provided between the lower spring seat 25 and the upper spring seat 17. Thus, the transfer shaft 8c is always biased downward by the second spring member 19. Therefore, the armature 62 is vertically supported by the upward force by the first spring member 12 and the downward force by the second spring member 19. While driving current is not applied to the first electromagnet 5 or second electromagnet 6, the armature 62 is kept balanced between the first electromagnet 5 and the second electromagnet 6.

The displacement detect or mounting section 32 is provided with the spring seat 25 and a sensor housing 22 on which the displacement-detecting device 65 of the present invention is mounted. The spring seat 25 protrudes upward on the extension line of the transfer shaft 8. A permanent magnet 66 (not illustrated) is provided to the protruded portion. A sensor housing 22 is provided above the spring seat 25 to face the protruded portion of the spring seat 25. The housing 22 is fixed in the inner surface of a cylinder like fixing member 24, which carries the upper spring seat 17 at its bottom end on its outer surface.

The sensor housing 22 is provided with a cylindrical guide hole 23 to accommodate a permanent magnet 66 shown in FIG. 4, which is provided to the protruded top portion of the spring seat 25. The Hall element 67 is provided to a recess formed in the sensor housing 22 (FIG. 3).

When current is supplied to the first electromagnet 5, the first magnetic yoke 15 and the armature 62 are magnetized and attract each other, the armature 62 being attracted upward. As a result, the valve 61 is driven upward by the transfer shaft 8 and stops at the valve seat 7 closing the opening. By stopping the supply of current to the first electromagnet 5 and supplying current to the second electromagnet 6, the second magnetic yoke 16 and the armature 62 are magnetized. The armature 62 is driven downward with the action of gravity and the magnetic force and stops at the second magnetic yoke 16. As a result, the valve 61 is driven downward by the transfer shaft 8 opening the valve opening.

Figure 3:
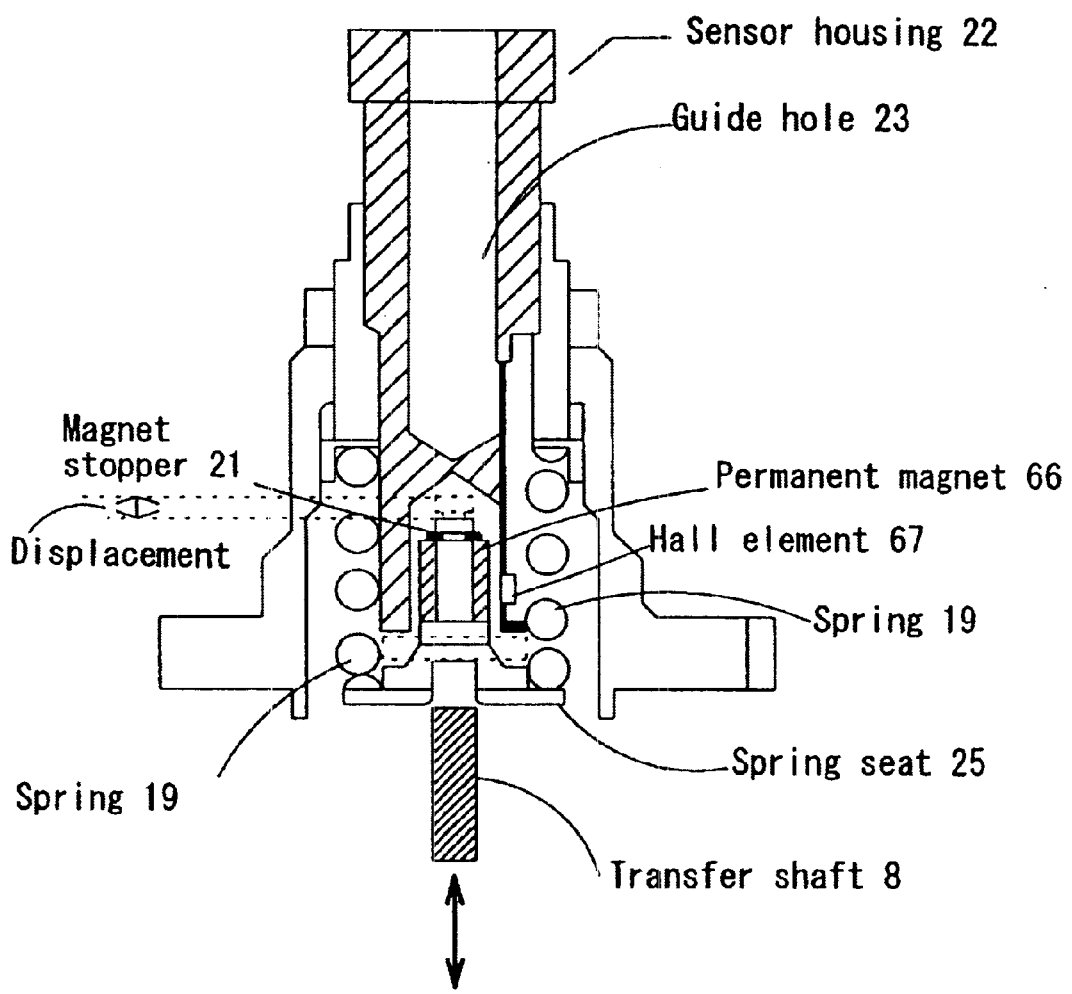
FIG. 3 is an illustration showing a mechanical structure of displacement detecting device in one embodiment of the present invention.

FIG. 3 shows an enlarged schematic view of the sectional structure of the inside of the displacement detector mounting section 32 of the electromagnetic actuator 60 shown in FIG. 2. As described above, the displacement detector mounting section 32 is provided with the spring seat 25 and the sensor housing 22, and the displacement-detecting device 65 is provided on the seat 25 and the housing 22. The displacement-detecting device 65 comprises the permanent magnet 66 and the Hall element 67. The permanent magnet 66 is cylinder-shaped and is magnetized in the displacement direction. The permanent magnet 66 is inserted into a protrusion from the spring seat 25 and is fixed with a magnet stopper 21. The Hall element 67 is inserted into the wall of the guide hole 23 of the sensor housing 22 so that the magnetism-sensing surface of the element 67 faces the side surface of the permanent magnet 66. Thus, because the permanent magnet 66 is placed at the top end of the transfer shaft 8c, displacement of the armature 62 is detected by detecting displacement of the permanent magnet 66.

Figure 4A:
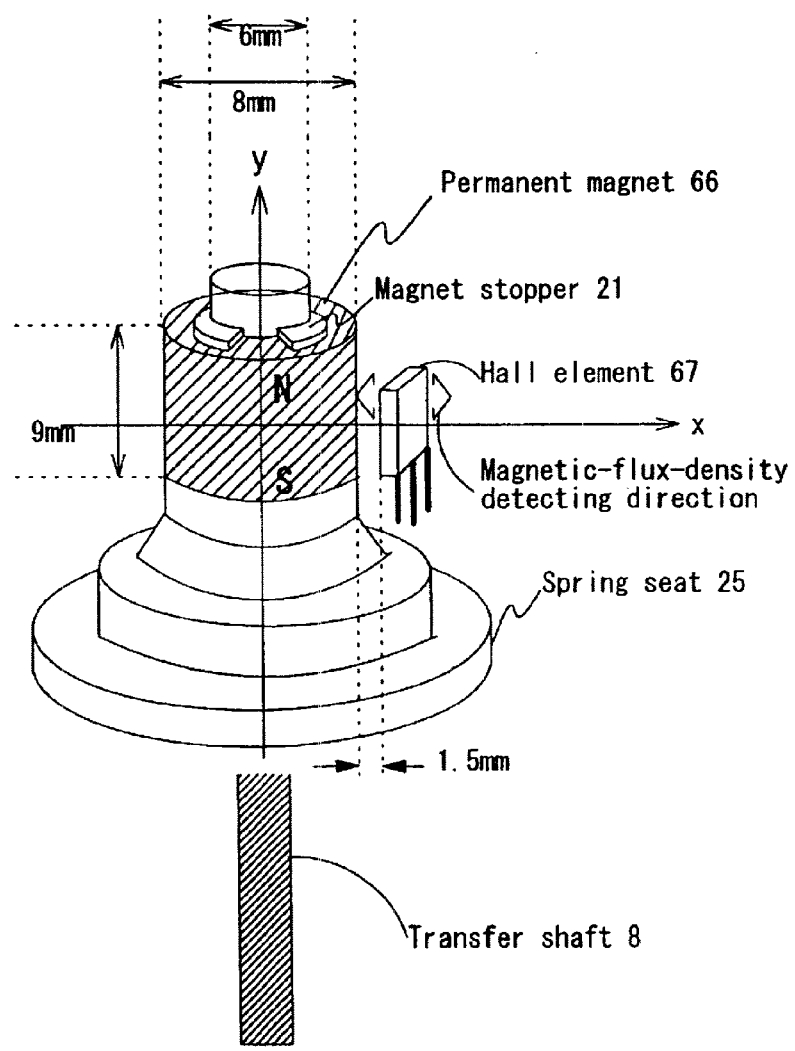
FIG. 4 is an illustration showing arrangement shapes of a permanent magnet and a Hall element in one embodiment of the present invention.
Figure 4B:
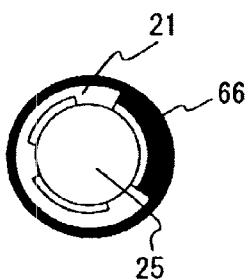

FIG. 4(a) shows shapes of the permanent magnet 66 and Hall element 67. FIG. 4(b) shows a top view of the permanent magnet 66 regulated by the magnet stopper 21. As shown in FIG. 4(b), the magnet stopper 21 is C-shaped. As shown in FIG. 4(a), the permanent magnet 66 is inserted into the protruded portion of the spring seat 25 from the upper end. The magnet stopper 21 is also inserted from the lateral side. Thus, the permanent magnet 66 is regulated to the spring seat 25.

As shown in FIG. 4, x- and y-axes are provided for convenience' sake. The armature 62 is displaced along a y-axis. The permanent magnet 66 is a cylinder having an outside diameter of 8 mm and an inside diameter of 6 mm, in which the y-axial length (hereafter referred to as magnet length) is 9 mm. The length of the permanent magnet 66 is chosen to be larger than the distance of movement of the armature 62. This is because a magnetic-flux density detected by the Hall element 67 is linear relative to the y-axis displacement over the range of the length of the permanent magnet 66 as described later. Because displacement of an armature normally is 6 to 8 mm in the case of a valve system of a vehicle, a magnet length is provided to a slightly large value of 9 mm so as to have a margin. The upper side of the permanent magnet 66 is magnetized to N pole and the lower side is magnetized to S pole. Shapes of the poles and the intensity of magnetization of the magnet are optimized by considering the size of the guide hole 23 of the sensor housing 22 and the magnitude of a detected magnetic flux.

It is also possible to magnetize the permanent magnet 66 in the direction opposite to the above direction in another embodiment. An electromagnet may be used instead of the permanent magnet 66. Furthermore, it is possible to use a magnet having a shape other than a cylindrical shape.

An x-axial position of the Hall element 67 is provided to a position a predetermined distance apart from the side surface of the permanent magnet 66. In the case of this embodiment, the x-axial position is set to a position 1.5 mm apart from the side face. When the distance is too large, the level of magnetic-flux density that can be detected by the Hall element 67 is greatly lowered. Therefore, a distance of 1 to 2 mm is preferable. A y-axial position of the Hall element 67 is set so that the y-axial central position of the permanent magnet 66 coincides with the center of the Hall element 67 when the armature 62 is present at the center between the first electromagnet 5 and the second electromagnet 6 as shown in FIG. 1 (that is, when current is not applied to the first electromagnet 5 or the second electromagnet 6). Thus, the Hall element 67 detects the x-axis component of a magnetic flux generated by the permanent magnet 66.

Figure 5A:
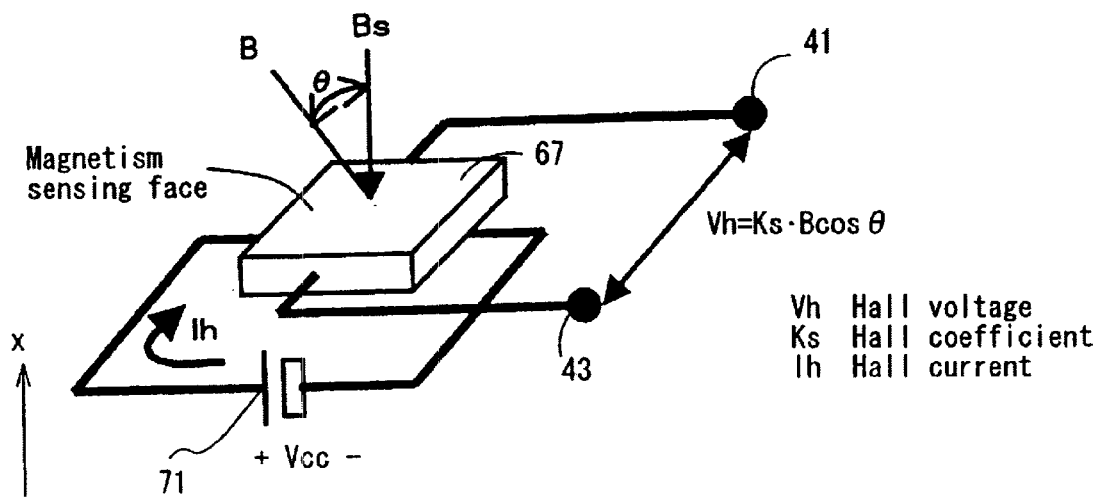
FIGS. 5A and 5B are illustrations showing a theory of a Hall element (5A) and a graph of magnetic-flux density and Hall output voltage (5B) in one embodiment of the present invention.

The Hall element is described below by referring to FIG. 5. It is a device from which a voltage proportional to a magnetic field can be obtained. The structure is simple, compact, strong and stable since there is no mechanically moving section. As shown in FIG. 5A, a voltage Vcc supplied from the voltage source 71 shown in FIG. 1 is applied to the Hall element 67 to provide a current Ih. When the Hall element 67 is put in a magnetic field H (that is, a magnetic-flux density B) under the above state, the current Ih in the Hall element 67 is subjected to a force and a Hall voltage Vh is generated between terminals 41 and 43. The voltage Vh is shown by the following Equation (1).

$$Vh = Ks \cdot Ih \cdot B \cos \theta \qquad \text{Equation (1)}$$

In the above expression, B cos θ denotes the x-axis component of the magnetic-flux density B (that is, direction vertical to the magnetism sensing face of the Hall element), which is hereafter shown as Bs. Ks denotes a value intrinsic to a Hall element referred to as Hall coefficient and the current Ih denotes a driving current resulting from the voltage source Vcc (e.g. 5 V) and an input resistance. Ks and Ih are specified in accordance with a Hall element used.

Figure 5B:
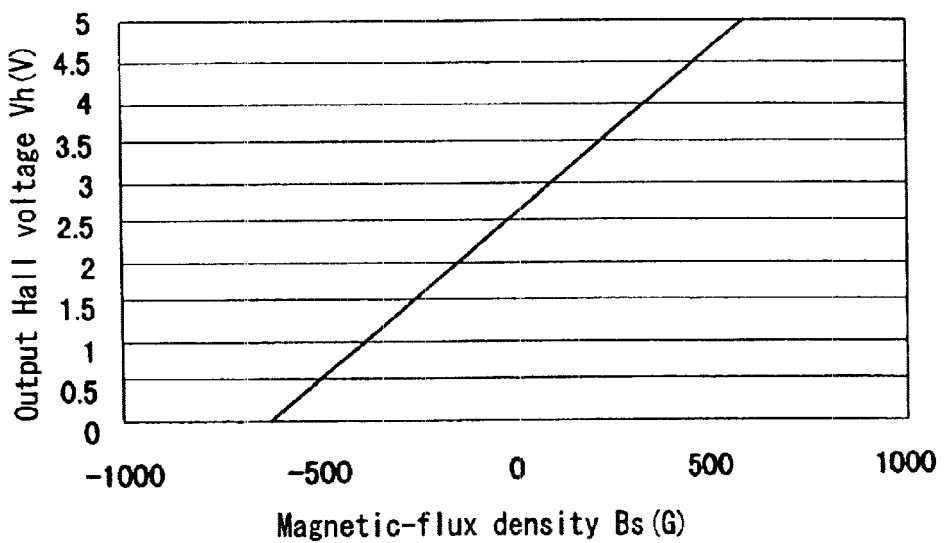

As shown in the expression (1), the Hall voltage Vh is proportional to the magnetic-flux density Bs. FIG. 5B is a graph showing the proportional relation between the Hall voltage Vh and the magnetic-flux density Bs. Therefore, by using the Hall element 67 and thereby measuring the Hall voltage Vh, the magnetic-flux density Bs is detected. Moreover, it is possible to determine the polarity of the magnetic field (N or S) in accordance with the polarity of the Hall voltage.

Now, the relation between an x-axis component Bs of the magnetic-flux density of the permanent magnet 66 having the shape in FIG. 4 and a y-axial displacement of the permanent magnet 66 is described below by referring to FIG. 6. FIG. 6(a) shows the permanent magnet 66 in FIG. 4, in which an x-axis is set in the horizontal direction and a y-axis is set in the vertical direction by using the center of the permanent magnet 66 as an origin. The permanent magnet 66 is vertically displaced along the y-axis. The length of the permanent magnet 66 is assumed to be 9 mm. Point A is set to a position 1.5 mm apart from the origin on the x-axis. The position of the point A corresponds to the position at which the Hall element 67 is put as described above.

Figure 6B:
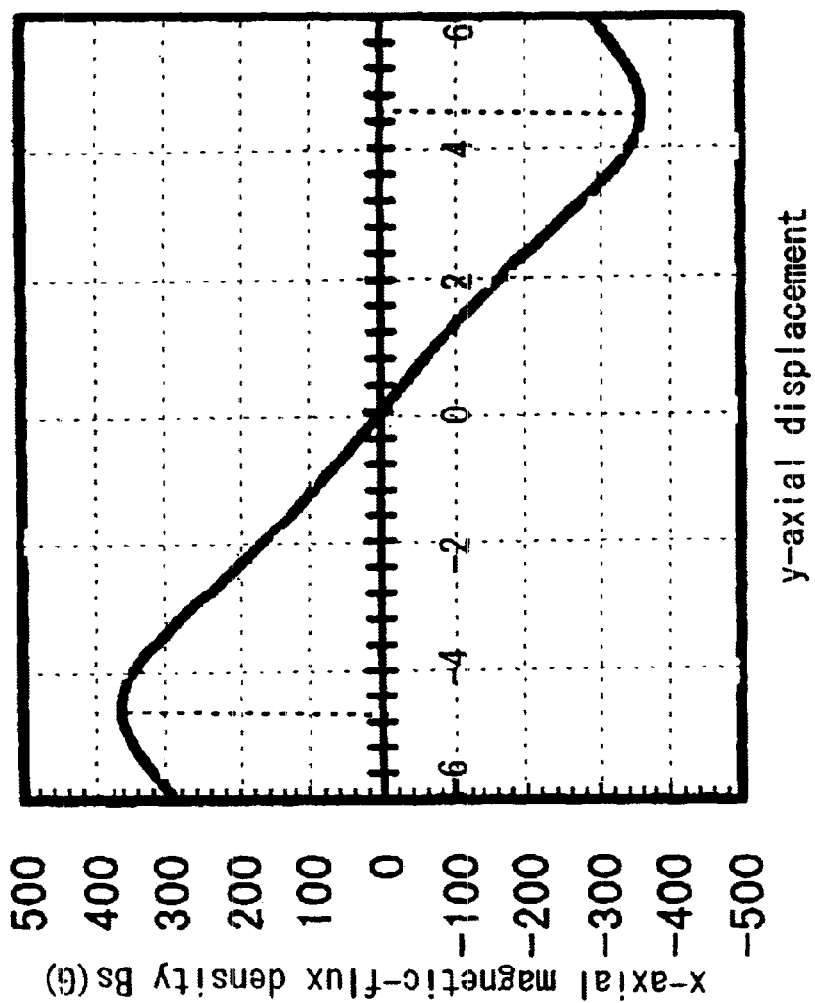
FIGS. 6(a) and 6(b) are illustrations showing apermanent magnet (6A) and a relation between displacement and magnetic-flux density of the permanent magnet (6B) in one embodiment of the present invention.
Figure 6A:
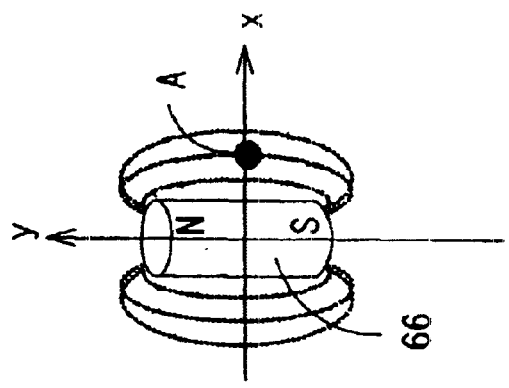

The graph in FIG. 6(b) shows a change of the magnetic-flux density Bs at the point A to y-axial direction when the permanent magnet 66 is vertically displaced on the y-axis. When the permanent magnet 66 is present at the position of y=0, magnetic fields from N and S poles of the permanent magnet 66 cancel each other in an x-axial direction. Therefore, the magnetic-flux density Bs becomes zero. The upper side of the permanent magnet 66 is magnetized as N pole and the lower side of it is magnetized as S pole and the magnet 66 is displaced in a magnetized direction. Therefore, when the permanent magnet 66 is displaced upward from the origin (that is, in the positive direction of the y-axis), the magnetic-flux density Bs increases in a negative area (in this case, "increase" represents that the absolute value of the magnetic-flux density Bs, that is, |Bs| increases). When the center of the permanent magnet 66 is displaced upward to the position of y=+4.5 mm, the magnetic-flux density Bs has a peak value. On the contrary, when the permanent magnet 66 is displaced downward from the origin (that is, in the negative direction of the y-axis), the magnetic-flux density Bs increases in a positive area. When the permanent magnet 66 is displaced down the position of y=−4.5 mm, the magnetic-flux density Bs has a peak value.

The relation between the magnetic-flux density Bs and the displacement of the permanent magnet 66 as shown in FIG. 6(b) depends on the length of the magnet 66. When the permanent magnet 66 whose length is 9 mm is vertically displaced from the center, the density Bs has a peak at a position corresponding to ½ of the magnet length (that is, ±4.5 mm) The magnetic-flux density Bs is linear to y-axial displacement in a range of −4.5<y<4.5. Therefore, by setting the magnet length of the permanent magnet to a value larger than displacement to be detected, displacement of the magnet is easily detected because the displacement is linear to the magnetic-flux density.

The graph in FIG. 6(b) also depends on the distance (in this case, 1.5 mm) from the S and N poles of the permanent magnet 66 to the point A. In other words, the magnetic-flux density Bs at point A changes as the distance of point A from the origin changes, which changes the linearity characteristics shown by the graph. Even in this case, however, when the magnet length is 9 mm, the magnetic-flux density Bs is linear to y-axial displacement in the range of −4.5<y<4.5.

Thus, by providing the Hall element 67 at point A, the magnetic-flux density Bs having a linear relation with displacement of the permanent magnet 66 is detected by the Hall element 67. As described with reference to FIG. 5, the Hall voltage Vh is output which is proportional to the detected magnetic-flux density Bs.

Figure 7:
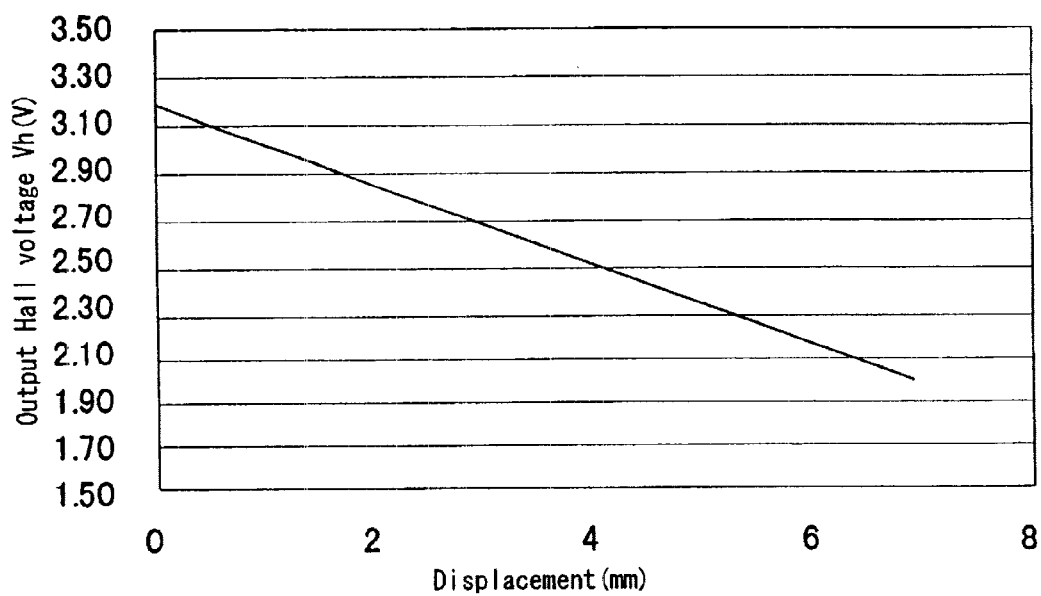
FIG. 7 is a graph showing a relation between Hall output voltage and displacement in one embodiment of the present invention.

The graph in FIG. 7 shows the relation between the output Vh of the Hall element 67 and displacement of the permanent magnet 66. The abscissa of the graph shows displacement on the basis of the position of y=−4.5 in FIG. 6. As described above, the Hall voltage Vh and the magnetic-flux density Bs are proportional to each other and the magnetic-flux density Bs has a linear relation with displacement in the range corresponding to the magnet length of the permanent magnet. Therefore, as shown in FIG. 7, the Hall output voltage Vh has a linear relation with displacement in the range of the magnet length (in this case, 9 mm).

Thus, the controller 50 shown in FIG. 1 can receive the Hall voltage Vh output from the Hall element 67 of the displacement detecting device 65 via the input interface 51, detect displacement of the armature 62 in accordance with the Hall voltage Vh, and output control signals so as to properly control the electromagnetic actuator 60 based on the detected displacement.

Figure 8:
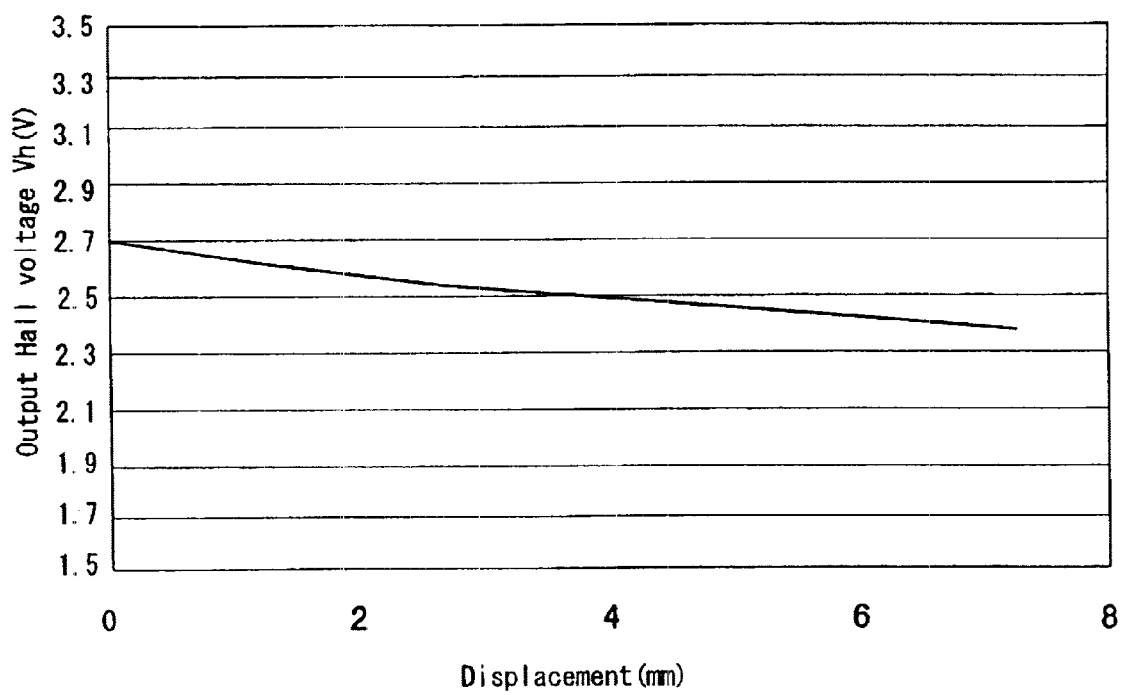
FIG. 8 is a graph showing a relation between Hall output voltage and displacement at the time of using a spring seat made of a magnetic material in one embodiment of the present invention.

It is preferable that the spring seat 25 and the magnet stopper 12 for regulating the permanent magnet 66 shown in FIG. 3 are respectively made of a non-magnetic material (e.g. alloy such as SUH660) or a material having characteristics close to the non-magnetic material (e.g. such as SUS303). This is because if a magnetic material is used, a magnetic balance is broken and the linearity to displacement of the Hall output voltage Vh is deteriorated as shown in FIG. 8.

Figure 9A:
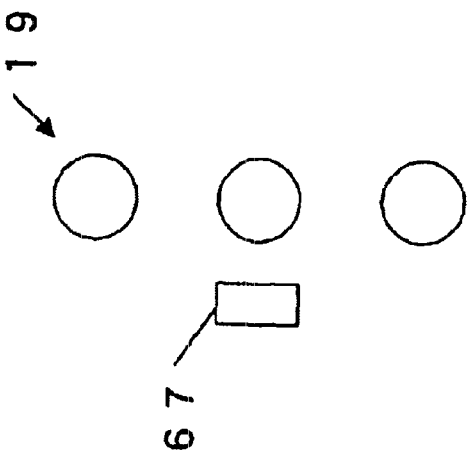
FIG. 9 is illustrations schematically showing a possible position of the Hall element and the spring.
Figure 9B:
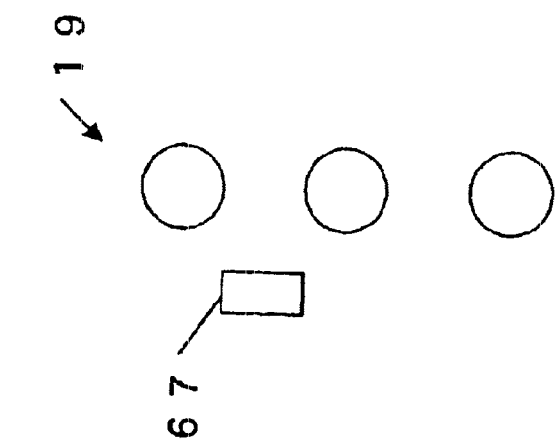
Figure 9C:
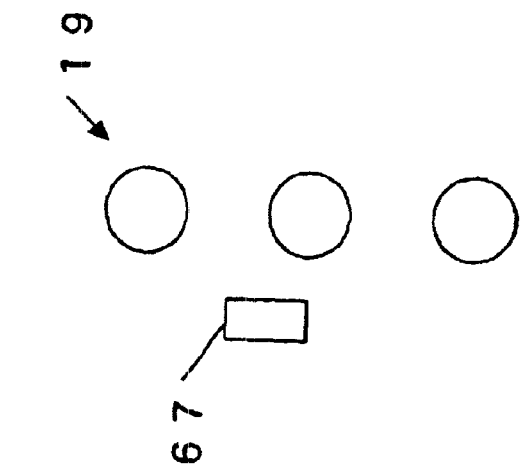

Referring to FIG. 3 again, the spring 19 is provided outside the Hall element 67. Since the spring is made of a magnetic material, the magnetic flux density detected by the Hall element 67 may fluctuate with the movement of the spring (i.e. the expansion or contraction of the spring 19). More particularly, FIG. 9 shows a possible position of the Hall element 67 and the spring 19. FIG. 9(a) shows a state in which the spring 19 is situated just behind the Hall element 67, FIG. 9(b) shows a state in which the spring is not situated behind the Hall element 67, and FIG. 9(c) shows a mid-state between FIGS. 9(a) and 9(b). The distribution of the magnetic flux originated from the permanent magnet 66 varies from one state to another because the spring 19 is made of a magnetic material. Therefore, the Hall output voltage may be different depending on the state of the spring 19, even if the displacement of the permanent magnet 66 is actually the same.

Figure 10:
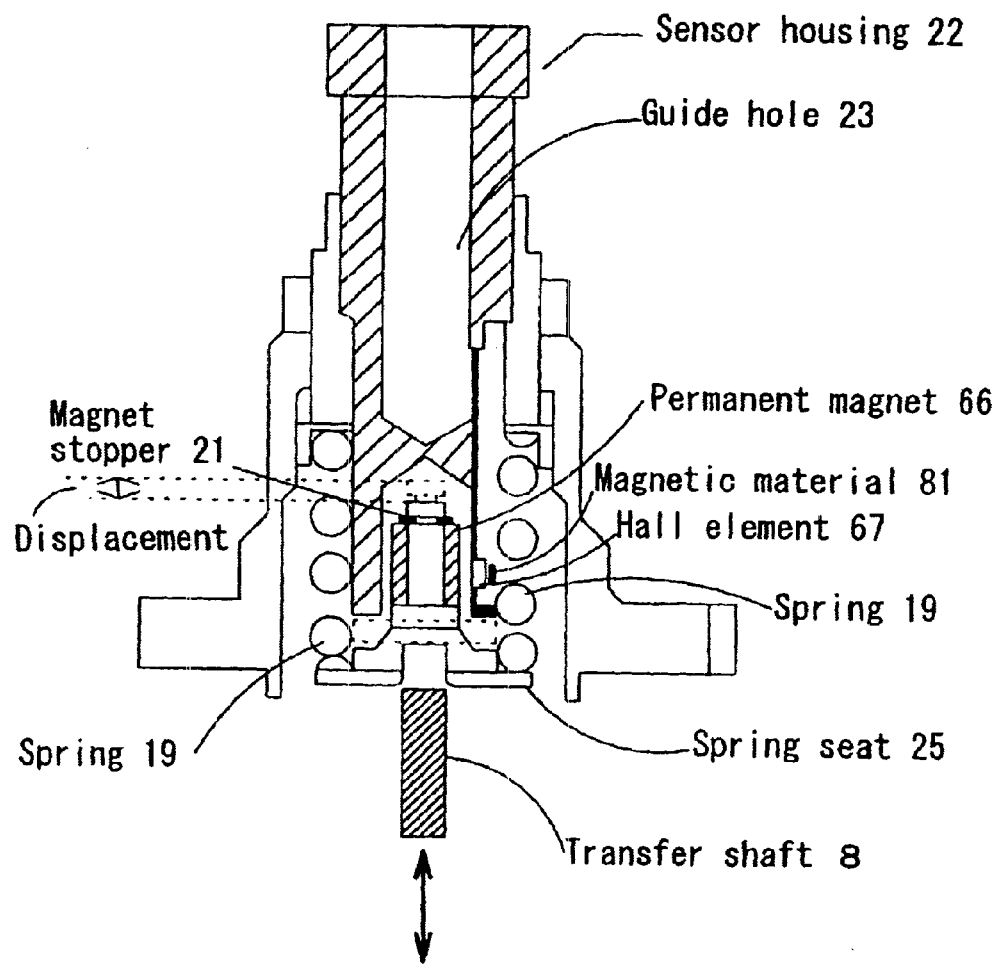
FIG. 10 is an illustration showing a mechanical structure of displacement detecting device in another embodiment of the present invention.
Figure 11:
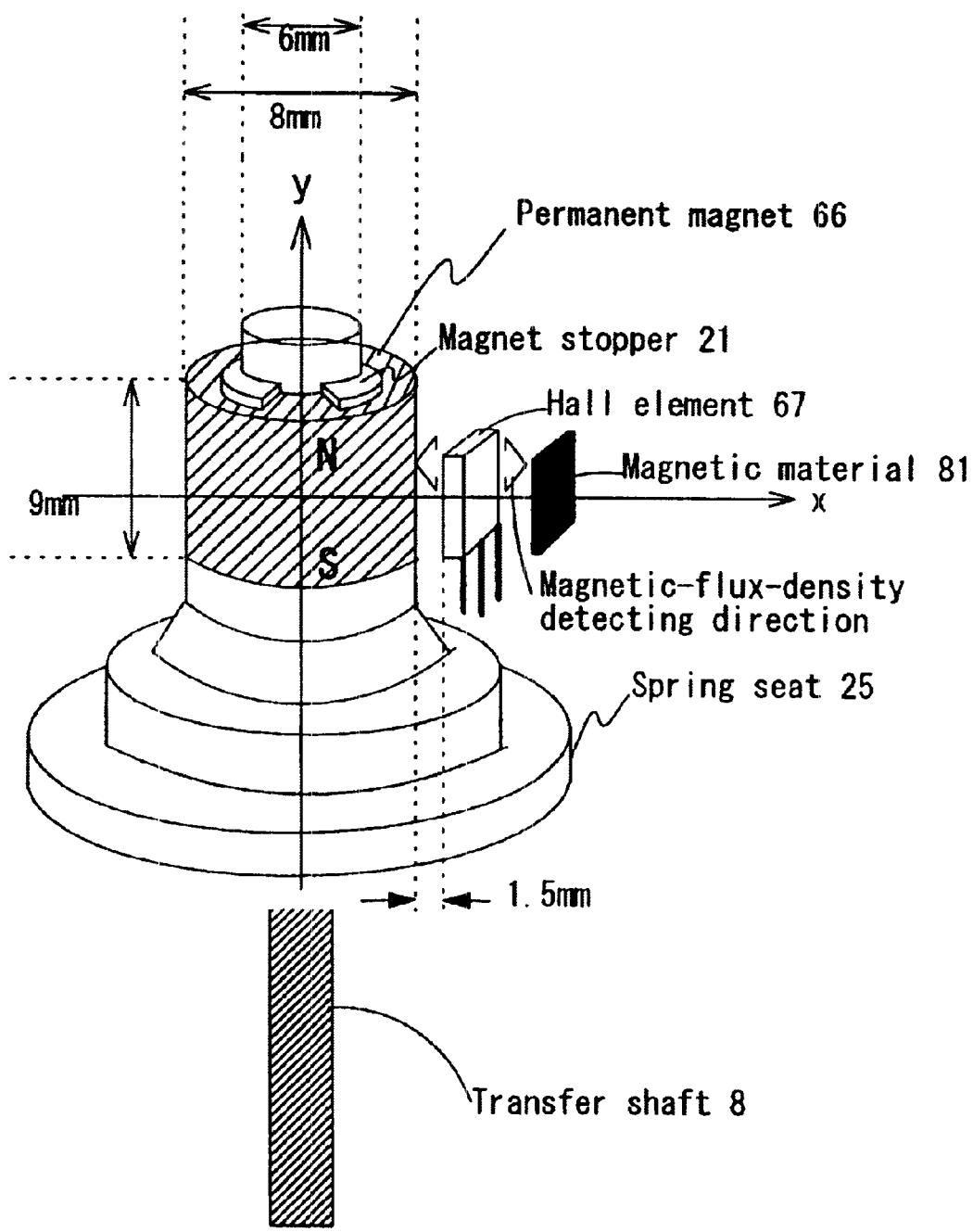
FIG. 11 is an illustration showing arrangement shapes of a permanent magnet and a Hall element in another embodiment of the present invention.

The second embodiment of the present invention can reduce the above effect of the spring 19. The second embodiment will be described referring to FIGS. 10 and 11. FIG. 10 shows the same structure as FIG. 3 except that a magnetic material 81 is provided between the Hall element 67 and the spring 19. FIG. 11 shows the same structure as FIG. 4 except that the magnetic material 81 is provided behind the Hall element 67 with respect to the permanent magnet 66. As seen FIGS. 10 and 11, the magnetic material 81 is provided just behind the Hall element 67. In the other words, the magnetic material 81 is provided so as to face the opposite surface to the magnetism-sensing surface of the Hall element 67. The magnetic material 81 is a small piece which, for example, has a thickness of 1 mm. Alternatively, a permanent magnet may be used instead of the magnetic material 81.

The magnetic material 81 is closer to the permanent magnet 66 than the spring 19. Since the magnetic material 81 provided behind the Hall element 67 attracts the magnetic flux from the magnet 66, the magnetic flux passing through the Hall element 67 will increase. The magnetic material 81 also has a function of shielding the Hall element 67 from the magnetic field which may be generated by the spring 19. Thus, the disturbance of the magnetic flux caused by the spring 19 is reduced.

Figure 12:
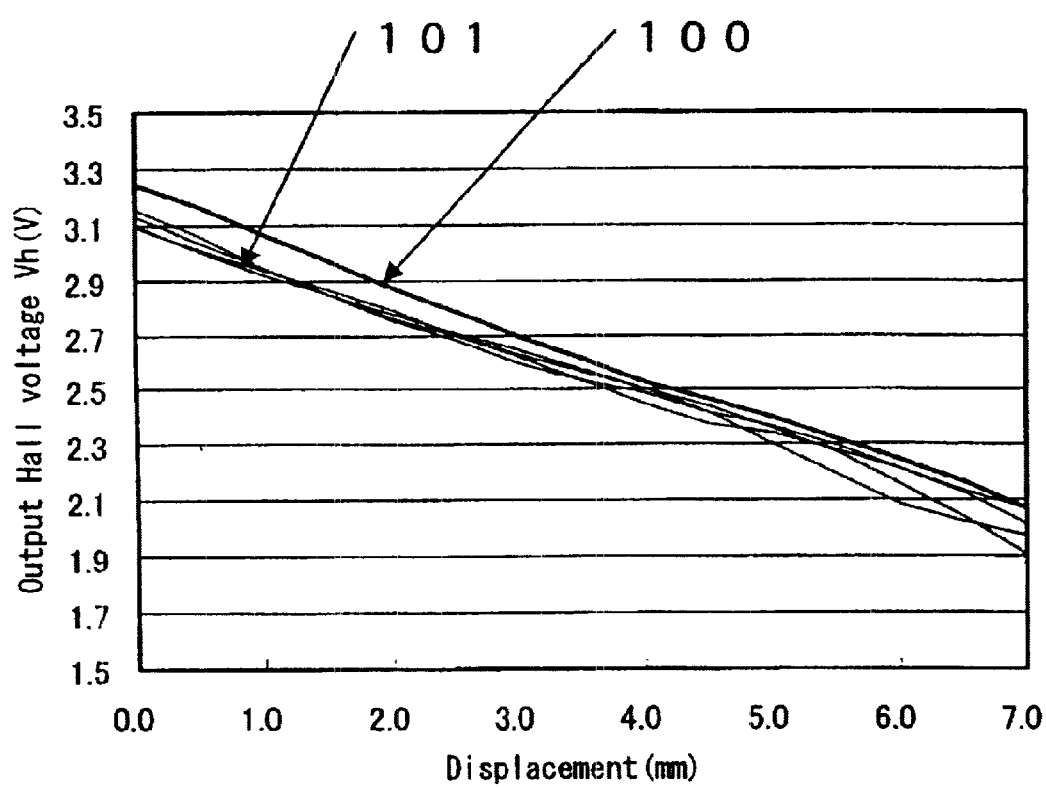
FIG. 12 is a graph showing a relation between Hall voltage and displacement in another embodiment of the present invention.

FIG. 12 is a graph showing the relation between the Hall output voltage and the displacement of the permanent magnet 66. The graph 100 corresponds a state in which the magnetic material 81 is provided between the Hall element 67 and the spring 19 while the graph 101 corresponds a state in which the magnetic material 81 is not provided. The graph 101 contains a plurality of lines, showing means that characteristic of the Hall output voltage depends on the state of the spring 19. As seen in FIG. 12, the graph 100 has better linearity than the graph 101. Thus, use of the magnetic material 81 enables the effect of the spring on the Hall output voltage to be reduced, the Hall output voltage having better linearity being obtained.

Referring to FIG. 2 again, the transfer shaft 8, which passes through inside of the first electromagnet 5 and the second electromagnet 6, is connected to the spring seat 25 as described above. Leakage flux originates from the first and second electromagnets 5 and 6 when a current is supplied to the first electromagnet 5 or the second electromagnet 6. The leakage flux extends above the spring seat 25 to which the transfer shaft 8 is connected because the transfer shaft 8 is typically made of a magnetic material such as SCM420H. Therefore, the magnetic field around the Hall element 67 which is positioned above the spring seat 25 is disturbed by the leakage flux. As a result, the Hall voltage output from the Hall element 67 may changes with the leakage flux. In other words, the Hall output voltage may be different in accordance with the leakage flux, even if the displacement of the permanent magnet 66 is actually the same.

The third embodiment of the present invention reduces the above effect of the leakage flux. According to the third embodiment, the transfer shaft 8 connected to the spring seat 25 is made of a non-magnetic material (e.g. alloy such as SUH660) or a material having characteristics close to the non-magnetic material (e.g. such as SUS303). The transfer shaft 8 is provided between the first and second electromagnets 5 and 6 and the spring seat 25. Therefore, with the transfer shaft 8 being made of a non-magnetic material, the effect of the leakage flux extending above the spring seat 25 when current is supplied to the first and second electromagnets 5 and 6 is reduced.

As indicated in FIG. 1, the transfer shaft 8 comprises three portions 8a, 8b and 8c. According to the third embodiment of the present invention, all the tree portions 8a, 8b and 8c may be made of a non-magnetic material. Alternatively, only the portion 8c, which is directly connected to the spring seat 25, may be made of a non-magnetic material. It is preferable that the spring seat 25 is also made of a non-magnetic material as described above.

Figure 13:
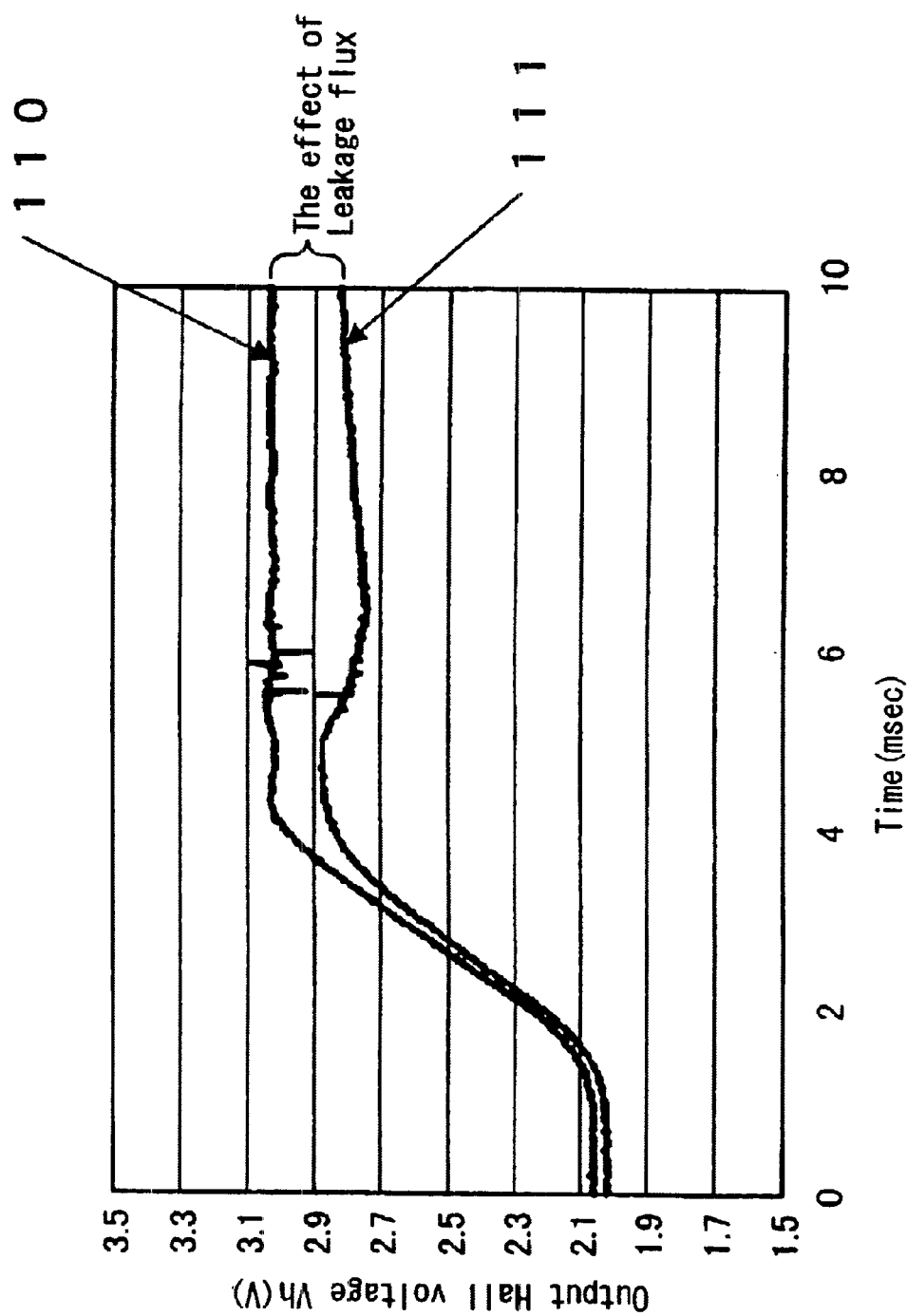
FIG. 13 is a graph showing a transition of the Hall voltage when the permanent magnet moves with time in another embodiment of the present invention.

FIG. 13 shows a transition of the Hall output voltage when the permanent magnet 66 moves with time. More particularly, during the period from zero to 1.5 msec the valve is in a closed state. Then the permanent magnet 66 moves downward by supplying a current to the second electromagnet 6 during the period from 1.5 to 4 msec. At the time of 4 msec, the valve is opened, and during the period 4 to 10 msec the valve is in an open state. The graph 110 shows the transition of the Hall output voltage when the transfer shaft 8 is made of a non-magnetic material while the graph 110 shows the transition of the Hall output voltage when the transfer shaft 8 is made of a magnetic material. The difference between the Hall output voltages of the graphs 110 and 111 corresponds to the effect of the leakage flux. The Hall output voltage indicated in the graph 111 is, especially when the valve is in a closed state, less than that of the graph 110. Thus, the transfer shaft made of a non-magnet material can make the leakage flux ineffective, the stable Hall output voltage being obtained.

The above embodiment uses a Hall element as a magnetic sensor. However, it is also possible to implement the displacement-detecting device by using other magnetic sensors. For example, a magneto-resistive element (MR element) can be used, in which resistance changes in proportion to a magnetic field. Therefore, by detecting an output voltage of the magneto resistive element, it is possible to detect a magnetic-field change. Thus, a magneto resistive element can be used instead of a Hall element.

A magnet of the present invention may not be mounted to the spring seat but to other materials that move with displacement of the valve in a similar manner. In such a case, a magnetic sensor is placed so as to detect a magnetic flux generated by the magnet.

While the invention is described with respect to specific embodiments, the invention is not limited to such embodiments.

What is claimed is:

1. Displacement detecting device for detecting displacement of a movable intake/exhaust valve; comprising:
    a spring seat for supporting a spring,
    a transfer shaft for connecting the spring seat and the intake/exhaust valve,
    a magnet provided on the spring seat and the magnet magnetized in the direction of movement of the intake/exhaust valve,
    a magnetic sensor having at least a first surface and a second surface provided between the magnet and the spring, the magnetic sensor detecting magnetic flux generated by the magnet and outputting a sensor output indicative of displacement of the intake/exhaust valve, wherein at least a portion of the first surface of the magnetic sensor lies tangentially to a portion of the magnet, and
    a piece of a magnetic material provided adjacent to and behind the magnetic sensor, said piece facing the second surface of the magnetic sensor for attracting magnetic flux from the magnet toward the magnetic sensor.

2. The displacement detecting device according to claim 1, wherein the magnetic sensor is a Hall element and the sensor output is a Hall voltage.

3. The displacement detecting device according to claim 1, wherein the length of the magnet is larger than the distance of the movement of the intake/exhaust valve.

4. The displacement detecting device according to claim 1, wherein the magnet is connected to the intake/exhaust valve through a non-magnetic member or a material having characteristics close to the non-magnetic material.

5. The displacement detecting device according to claim 1, wherein the transfer shaft is made of a non-magnetic member or a material having characteristics close to the non-magnetic material.

6. The displacement detecting device according to claim 1, wherein the spring seat is made of a non-magnetic material or a material having characteristics close to the non-magnetic material.

7. The displacement detecting device according to claim 1, wherein the magnet is a cylindrical permanent magnet.

8. The displacement detecting device according to claim 1, wherein the magnet has a through hole extending from a first end portion to a second end portion, the through hole having inner portion capable of mating with an outer surface of a protruding portion of the spring seat to connect the magnet and the intake/exhaust valve so that at least the inner portion of the through hole is in mechanical communication with at least the outer surface of the protruding portion of the spring seat.

9. The displacement detecting device according to claim 1, wherein the piece of the magnetic material comprises a magnet.

10. A displacement detecting device for detecting displacement of an intake/exhaust valve of an internal combustion engine driven by an electromechanical actuator, the displacement detecting device comprising:
    a cylindrical magnet external to the actuator, a portion of the cylindrical magnet substantially enveloping a portion of a transfer shaft of the intake/exhaust valve that extends beyond the actuator so as substantially avoid magnetic flux interference from the actuator, the cylindrical magnet being polarized in the direction of movement of the intake/exhaust valve; and
    a magnetic sensor external to the actuator for detecting magnetic flux generated by the cylindrical magnet and outputting a sensor output detecting the displacement of the intake/exhaust valve, the sensor output being substantially linear and substantially free of magnetic flux interference from the electromechanical actuator.

11. The displacement detecting device according to claim 10, wherein the displacement detecting device is provided above the electromechanical actuator.

12. The displacement detecting device according to claim 10, wherein the magnetic sensor is a Hall element and the sensor output is a Hall voltage.

13. The displacement detecting device according to claim 10, wherein the length of the magnet is larger than the distance of the movement of the intake/exhaust valve.

14. The displacement detecting device according to claim 10, wherein the magnet is connected to the intake/exhaust valve through a non-magnetic member or a material having characteristics close to the non-magnetic material.

15. The displacement detecting device according to claim 10, further comprising a spring seat for supporting a spring, the spring seat connected to the intake/exhaust valve via the transfer shaft,
    wherein the magnet is provided on the spring.

16. The displacement detecting device according to claim 15, wherein the magnetic sensor is provided between the magnet and the spring.

17. The displacement detecting device according to claim 10, wherein the transfer shaft is made of a non-magnetic member or a material having characteristics close to the non-magnetic material.

18. The displacement detecting device according to claim 15, wherein the spring seat is made of a non-magnetic member or a material having characteristics close to the non-magnetic material.

19. The displacement detecting device according to claim 10, wherein the magnet is a cylindrical permanent magnet.

20. The displacement detecting device according to claim 15, wherein the magnet has an annular bore extending in the polarized direction, wherein a protrusion portion of the spring seat is inserted into the annular bore, wherein one end of the magnet is fixed on the spring seat and the other end of the magnet is fixed with a magnet stopper.

21. The displacement detecting device according to claim 10, wherein the magnet is fixed to the portion of the transfer shaft by a magnet stopper wherein the magnet stopper in C-shaped.

* * * * *